No. 725,232. PATENTED APR. 14, 1903.
S. R. EARNEST.
TWINE HOLDER AND CUTTER.
APPLICATION FILED JUNE 26, 1902.
NO MODEL.
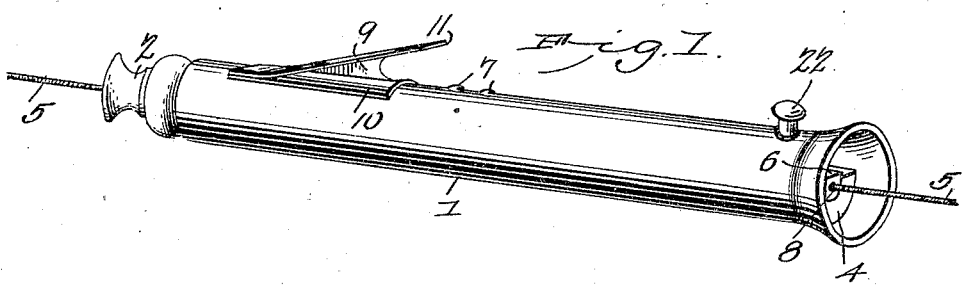
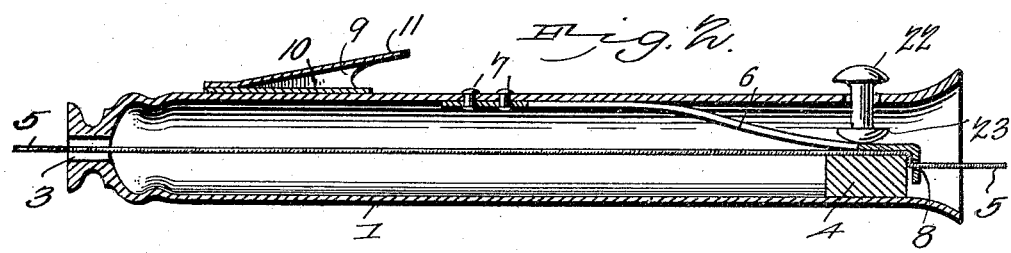
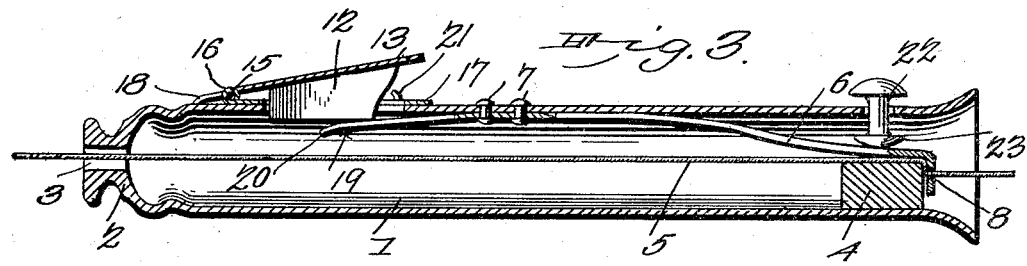
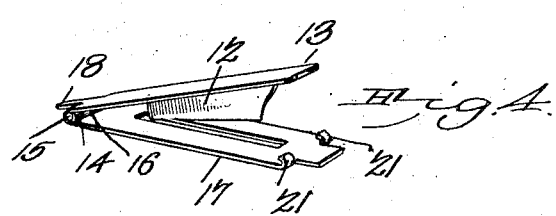
S. R. Earnest, Inventor.
by C. A. Snow & Co.
Attorneys
Witnesses
E. F. Stewart
J. F. Riley

UNITED STATES PATENT OFFICE.

SAMUEL RHEA EARNEST, OF COLORADO SPRINGS, COLORADO.

TWINE HOLDER AND CUTTER.

SPECIFICATION forming part of Letters Patent No. 725,232, dated April 14, 1903.

Application filed June 26, 1902. Serial No. 113,347. (No model.)

*To all whom it may concern:*

Be it known that I, SAMUEL RHEA EARNEST, a citizen of the United States, residing at Colorado Springs, in the county of El Paso and State of Colorado, have invented a new and useful Twine Holder and Cutter, of which the following is a specification.

The invention relates to improvements in twine holders and cutters.

The object of the present invention is to improve the construction of twine holders and cutters and to provide an exceedingly simple and inexpensive device of great strength and durability adapted to receive and hold the free end of the twine or cord and capable of protecting the hand and the twine and of enabling the latter to be quickly wrapped around a package and rapidly severed the proper length for tying.

A further object of the invention is to provide a device of this character which will grip the twine sufficiently to prevent it from accidentally slipping and at the same time permit the twine to be drawn through it when the proper force is applied.

The invention consists in the construction and novel combination and arrangement of parts hereinafter fully described, illustrated in the accompanying drawings, and pointed out in the claims hereto appended.

In the drawings, Figure 1 is a perspective view of a twine holder and cutter constructed in accordance with this invention. Fig. 2 is a longitudinal sectional view of the same. Fig. 3 is a similar view showing the preferred form of my invention. Fig. 4 is a detail view illustrating the construction of the hinged blade and the manner of mounting the same.

Like numerals of reference designate corresponding parts in all the figures of the drawings.

1 designates a tube or barrel forming the body portion of the twine-holder and adapted to be held in the hand while wrapping the twine around a package or bundle, and it is provided at one end with a reduced portion 2, having a small opening from which the twine is drawn. The other end of the tube or barrel is preferably enlarged or flared; but it may be constructed in any other desired manner, and a block 4 of approximately semicircular shape is arranged within this end of the tube or barrel and is adapted to receive the twine 5, which is clamped against the block 4 by means of a spring 6. The spring 6 extends longitudinally of the twine-holder and is secured within the tube or barrel by means of rivets 7 or other suitable fastening devices, and it bears against the twine with sufficient force to prevent the same from accidentally slipping, and at the same time it is adapted to permit the twine to be drawn through the device when the proper force is applied, forming a yielding brake device for the twine. The outer end of the spring is bent downward approximately at right angles and is provided with an aperture 8, forming an eyelet through which the twine is threaded, whereby the twine is retained in proper position with relation to the spring and the block or seat. In threading the twine through the device the spring is raised slightly, and the tapering interior at the other end of the tube or barrel will enable the twine to be readily passed through the device.

The device is provided on its exterior adjacent to the end 2 with a cutting device consisting of a tapering blade 9, provided at its inner end with a cutting edge and secured between a base-plate 10 and a thumb-guard 11. The blade, which is preferably constructed of steel, is provided at its inner end with a cord-receiving recess or notch and is oppositely beveled thereat to form the said cutting edge, and after the twine has been wrapped around the bundle or package it is looped around the cutter and is readily severed by a quick movement of the device. The base-plate is slightly curved to conform to the configuration of the tube or barrel; but the device, which forms a grip or handle, may be of any other desired configuration. The thumb-guard is arranged at an angle to the body portion of the device and extends beyond the blade and forms a convenient surface to receive the thumb in grasping the device, which is held in the hand with the thumb extended toward the end 2. The inclined thumb-guard will then lie beneath the thumb and will conform to the configuration of the hand and facilitate gripping the device.

In Figs. 3 and 4 is illustrated the preferred form of the invention, in which a hinged knife or cutting-blade 12 is employed. The blade, which is constructed of steel, is provided at its inner end with a cutting edge, and it is fixed to a thumb-guard 13, which is arranged at an angle to the tube or body portion of the device. The thumb-guard is provided at its outer end with eyes 14, receiving a pintle 15, which also passes through an eye 16 of a base-plate 17. The hinged end of the thumb-guard is provided with a projecting lug 18, which is normally held in engagement with the tube or body portion by the inner end of the spring 19, arranged similar to that heretofore described and extended inward beyond the rivets and engaging the inner longitudinal edge of the blade. The cord is adapted to be placed adjacent to the cutting edge of the knife or blade, which is forced downward against the action of the spring by pressing upon the thumb-plate. In order to prevent the cord or twine from being forced outward by the blade, the base-plate is provided with a pair of oppositely-disposed tongues or projections 21. The tongues or projections are formed integral with the base-plate, preferably by reducing the inner end of the same and bending out a portion of the partially-severed metal. The inner end 20 of the spring 19 always maintains the cutter in proper position for operating on the twine.

The device is preferably constructed, as shown in the accompanying drawings, to form a handle for holding the free end of the twine and for permitting the same to be readily manipulated without injuring the hand or soiling the twine; but, if desired, it may be connected with a casing or receptacle for holding a ball of twine. Such receptacle or casing will be composed of separable sections detachably interlocked, similar to the ordinary twine-holder.

In order to enable the twine or cord to be positively held while wrapping and tying a package, a depressible button 22 is provided. This button, which has a head arranged on the exterior of the tube or barrel, is provided with a shank 23, extending through a perforation of the tube or barrel at a point opposite the block 4 and arranged to engage the spring to enable the latter to be pressed firmly against the cord. This device 22 does not interfere with the operation of the spring while the cord or twine is being drawn through the tube or barrel; but it will enable the operator to place the cord or twine under the desired tension, so that a package may be bound and tied as tightly as desired.

It will be seen that the device is exceedingly simple and inexpensive in construction, that it is adapted to hold the free end of a ball of twine in convenient position for ready use, that it serves as a handle for the same while wrapping the twine around a bundle, and that it will enable the twine to be readily severed. It will also be apparent that the spring yieldingly engages the twine and will enable the same to readily pass through the device when the proper force is applied and that the spring is entirely automatic in its operation.

What I claim is—

1. A device of the class described having a handle provided with a twine-passage and a seat, and a yielding brake having a portion normally bearing on said seat and a twine-guide offset from the portion which bears on the seat and adapted to be brought into the plane of the seat by straining the twine.

2. A device of the class described comprising a tubular body forming a handle and provided with an interior seat, and a spring arranged within the tubular body and provided between its ends with an engaging portion and having an end portion located beyond the seat and provided with a perforation receiving the twine, substantially as described.

3. A device of the class described comprising a tubular body portion forming a grip or handle to receive the free end of the twine and provided with means for engaging the same, a blade mounted on the exterior of the tubular body at a point between the ends thereof, and a thumb-guard extending over the blade, substantially as described.

4. A device of the class described comprising a tubular handle adapted to receive the free end of the twine, means for engaging the twine, and an exterior cutter mounted on the handle and comprising a base-plate, a blade, and a thumb-guard arranged at an angle to the base-plate, substantially as described.

5. A device of the class described comprising a tubular handle adapted to receive the free end of the twine and provided with means for engaging the same, a thumb-guard hinged to the handle, and a blade carried by the thumb-guard, substantially as described.

6. A device of the class described comprising a handle adapted to receive the free end of the twine, and a cutting device comprising a base-plate, a thumb-guard hinged to the base-plate, and a blade carried by the thumb-guard, substantially as described.

7. A device of the class described comprising a handle adapted to receive the free end of the twine, and a cutting device comprising a base-plate mounted on the handle and provided with a slot, a thumb-guard hinged to the base-plate and having a lug, a blade carried by the thumb-guard and extending through the slot, and means for holding the twine to the blade, substantially as described.

8. A device of the class described comprising a tubular handle, a thumb-guard hinged to the handle, a blade connected with the thumb-guard and extending into the handle, and a spring located within the handle and arranged to engage the blade and the twine, substantially as described.

9. A device of the class described comprising a tubular handle, a thumb-guard hinged to the handle and having a lug, a blade carried by the thumb-guard, and a spring located within the handle and engaging the blade and the twine, substantially as described.

10. A device of the class described comprising a tubular handle, an exterior cutting device comprising a base-plate having projections, a guard hinged to the base-plate, a blade carried by the guard and extending through the base-plate and the adjacent side of the handle, and a spring arranged within the handle and engaging the blade and arranged to engage the twine, substantially as described.

11. A device of the class described comprising a handle, a blade arranged on the exterior of the handle and movable into the same, and a spring housed within the handle and arranged to engage the blade and the twine, substantially as described.

12. A device of the class described having a handle provided with a twine-passage, a yielding brake, and a seat over which the twine passes, said brake having a twine-guide normally offset from the line of twine-passage, and terminally-exposed means for holding the brake in its twine-engaging position.

In testimony that I claim the foregoing as my own I have hereto affixed my signature in the presence of two witnesses.

SAMUEL RHEA EARNEST.

Witnesses:
H. P. ROBISON,
FRED R. SMITH.